D. Frost.
Thrashing Machine.
No. 61,333. Patented Jan. 22, 1867.
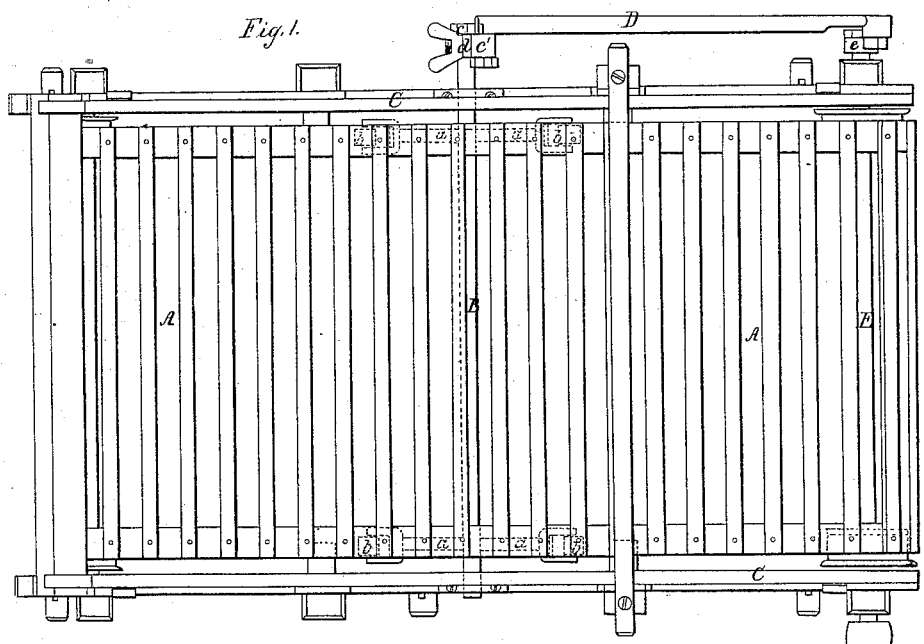
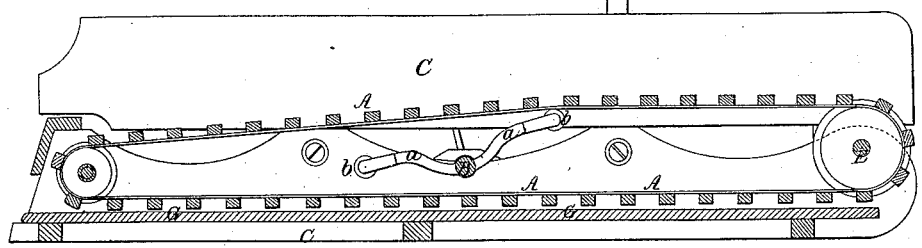
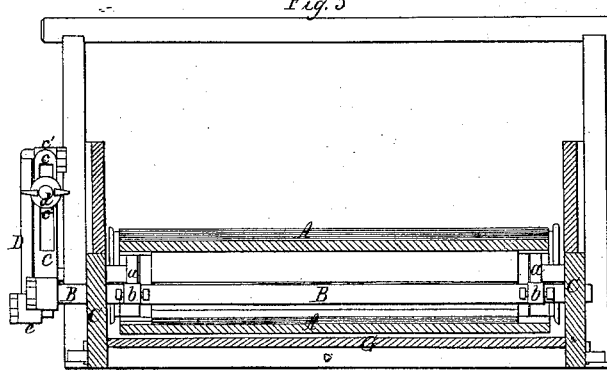
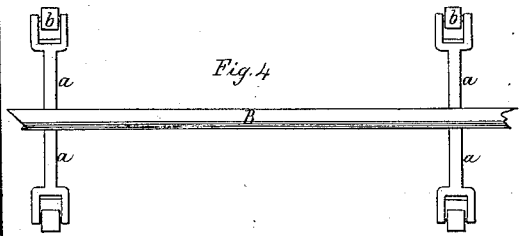
Witnesses
Inventor

United States Patent Office.

DAVID FROST, OF DUPAGE, ILLINOIS.

Letters Patent No. 61,333, dated January 22, 1867.

---

IMPROVEMENT IN SHAKER ATTACHMENT FOR THRESHING MACHINE.

---

The Schedule referred to in these Letters Patent and making part of the same.

---

TO ALL WHOM IT MAY CONCERN:

Be it known that I, DAVID FROST, of Dupage, in the county of Will, and State of Illinois, have invented a new and improved Shaker Attachment for Threshing Machines; and I do hereby declare that the following is a full and exact description thereof, reference being had to the accompanying drawings, making a part of this specification, in which—

Figure 1 is a top view of a straw carrier having my invention applied to it.
Figure 2 is a longitudinal section through the straw carrier and its shaker.
Figure 3 is a vertical transverse section through the straw carrier.
Figure 4 is a plan view of the shaker detached from the straw carrier.
Similar letters of reference indicate corresponding parts in the several figures.

The object of my invention is to apply vibrating shakers between the upper and lower slats of an endless straw carrier, for the purpose of giving a rapid shaking motion to the endless carrier during the operation of carrying off the straw from the thresher, thereby separating the grain from the straw in a more thorough manner than hitherto, as will be hereinafter described. Another object of my invention is to provide for giving a longer or shorter stroke to the shaker, at pleasure, according to the amount of vibration which it may be desired to give to the slatted carrier, as will be hereinafter described.

To enable others skilled in the art to understand my invention, I will describe its construction and operation.

Large quantities of grain are carried off with the straw during the operation of threshing by machinery, and to obviate this difficulty I apply between the endless slatted straw carrier A, which carries the straw from the threshing contrivances, a device which will give a rapid vibrating motion to that portion of the slatted carrier upon which the straw lies as it is moved away from the machine or the threshing cylinder. This device consists essentially of radial arms $a\ a$, which are secured to an oscillating shaft, B, that extends transversely across the carrier-frame C between the upper and lower portions of the endless carrier A, as shown in figs. 1, 2, and 3. The arms $a\ a$ are so arranged as to strike upon the narrow belts of the carrier, and the ends of these arms $a\ a$ have anti-friction rollers $b$ upon them which will offer very little resistance to the moving carrier. One end of the shaft B projects out from one side of the carrier-frame, and has a slotted arm, $c$, secured to it, to which arm a sliding-plate, $c^1$, is secured by means of a set-screw, $d$, which passes through the oblong slot in said arm $c$, by loosening which screw or nut $d$ the plate $c^1$ can be adjusted in the direction with the length of the arm toward or from the shaft B. The outer end of the adjustable plate $c^1$ has an eye through it, to which one end of a pitman, D, is passed; the opposite end of this pitman-rod is again pivoted to a crank, $e$, which is keyed on one end of a pulley-shaft, E. By turning this shaft E an oscillating motion will be communicated to the shaker-shaft B at the same time that the carrier A is moved in the direction indicated by the arrows in fig. 2. The length of stroke of the arms $a\ a$ may be increased or shortened by adjusting the plate $c$ nearer to or further from the axis of the shaft B. In arranging the shaft B within the endless belt or carrier A, reference must be had to the length of the arms $a\ a$, as it is desired to have these arms elevate the carrier in the centre at every vibration of the arms. One pair of arms will strike and elevate the carrier as the opposite pair of arms descend, and when these latter arms rise again they will strike and elevate the carrier; thus the carrier will not only be shaken with an up-and-down motion, but it will be rapidly elevated and dropped as it carries off the straw. These movements will toss up the straw, loosen it, and separate the grain from it in an effectual manner, the grain falling through the carrier upon a board, G, which will conduct it back and discharge it into a suitable receiver, while the straw, which has been divested of its grain, will be carried off and discharged at the outer or upper end of the carrier. I also am aware that lapping-slotted plates, confined at any desired point by a set-screw, have been used both in street-sweeping machines and in churns, and therefore I do not lay any broad claim to such plates; but What I do claim as my invention, and desire to secure by Letters Patent, is—

The application of the slotted lapping plates, confined together by a thumb-screw, to the pitman and vibrating knockers or shakers of a straw-carrier belt, all in the manner and for the purpose described.

DAVID FROST.

Witnesses:
JOHN B. FROST,
JONATHAN DITZLER.